US008800009B1

(12) United States Patent
Beda, III et al.

(10) Patent No.: US 8,800,009 B1
(45) Date of Patent: Aug. 5, 2014

(54) VIRTUAL MACHINE SERVICE ACCESS

(75) Inventors: Joseph S. Beda, III, Seattle, WA (US); Ridhima Kedia, Kolkata (IN)

(73) Assignee: Google Inc., Mountain View, CA (US)

( * ) Notice: Subject to any disclaimer, the term of this patent is extended or adjusted under 35 U.S.C. 154(b) by 20 days.

(21) Appl. No.: 13/402,975

(22) Filed: Feb. 23, 2012

Related U.S. Application Data

(60) Provisional application No. 61/581,993, filed on Dec. 30, 2011.

(51) Int. Cl.
*H04L 29/00* (2006.01)

(52) U.S. Cl.
USPC ............... 726/6; 713/155; 713/156; 713/157; 713/158; 713/159

(58) Field of Classification Search
USPC ................................................. 713/155–159
See application file for complete search history.

(56) References Cited

U.S. PATENT DOCUMENTS

| | | | |
|---|---|---|---|
| 5,463,768 A | 10/1995 | Cuddihy et al. |
| 5,655,081 A | 8/1997 | Bonnell et al. |
| 5,778,444 A | 7/1998 | Langan et al. |
| 5,794,224 A | 8/1998 | Yufik |
| 6,148,368 A | 11/2000 | DeKoning |
| 6,178,482 B1 | 1/2001 | Sollars |
| 6,449,671 B1 | 9/2002 | Patkar et al. |
| 6,490,651 B1 | 12/2002 | Shats |
| 6,505,211 B1 | 1/2003 | Dessloch et al. |
| 6,505,248 B1 | 1/2003 | Casper et al. |
| 6,587,866 B1 | 7/2003 | Modi et al. |
| 6,598,179 B1 | 7/2003 | Chirashnya et al. |
| 6,643,613 B2 | 11/2003 | McGee et al. |
| 6,829,678 B1 | 12/2004 | Sawdon et al. |
| 6,891,839 B2 | 5/2005 | Albert et al. |
| 6,898,697 B1 | 5/2005 | Gao et al. |

(Continued)

FOREIGN PATENT DOCUMENTS

| | | |
|---|---|---|
| EP | 1 130 845 | 9/2001 |
| EP | 1 253 766 | 12/2005 |
| WO | WO 2011/095516 | 8/2011 |

OTHER PUBLICATIONS

Moller, Jan, et al., "Internal Network Security", Feb. 1, 2000-May 18, 2001, Retrieved from the Internet: <URL: http://www.daimi.au.dk/~fwiffo/thesis/>, 183 pages.

(Continued)

*Primary Examiner* — Ghazal Shehni
(74) *Attorney, Agent, or Firm* — Fish & Richardson P.C.

(57) ABSTRACT

Methods, systems, and apparatus, including computer programs encoded on computer storage media, for accessing services from a virtual machine. One of the methods includes receiving requests for long-term security tokens from a host machine, each request comprising authentication information for a respective service account. The method include providing long-term security tokens to the host machine, wherein the long-term security tokens can be used to generate short-term security tokens for a virtual machine executing on the host machine. The method also includes generating by a process executing in a host operating system of the host machines a short-term security token based on a long-term security token of the long-term security tokens for use by a virtual machine executing on the host machine to access one of the respective service accounts, wherein the short-term security token is useable for a pre-determined amount of time.

21 Claims, 10 Drawing Sheets

(56) References Cited

U.S. PATENT DOCUMENTS

| | | | |
|---|---|---|---|
| 6,996,502 B2 | 2/2006 | De La Cruz et al. |
| 7,043,455 B1 | 5/2006 | Cuomo et al. |
| 7,062,718 B2 | 6/2006 | Kodosky et al. |
| 7,117,243 B2 | 10/2006 | Peart |
| 7,356,679 B1 | 4/2008 | Le et al. |
| 7,466,703 B1 | 12/2008 | Arunachalam et al. |
| 7,478,388 B1 | 1/2009 | Chen et al. |
| 7,500,262 B1 | 3/2009 | Sanin et al. |
| 7,529,836 B1 | 5/2009 | Bolen et al. |
| 7,584,467 B2 | 9/2009 | Wickham et al. |
| 7,596,620 B1 | 9/2009 | Colton et al. |
| 7,650,331 B1 | 1/2010 | Dean et al. |
| 7,653,833 B1 | 1/2010 | Miller et al. |
| 7,761,573 B2 | 7/2010 | Travostino et al. |
| 7,804,862 B1 | 9/2010 | Olson et al. |
| 7,836,285 B2 | 11/2010 | Giri et al. |
| 8,051,414 B2 | 11/2011 | Stender et al. |
| 8,065,717 B2 | 11/2011 | Band |
| 8,103,771 B2 | 1/2012 | Tanaka et al. |
| 8,108,903 B2 | 1/2012 | Norefors et al. |
| 8,127,295 B1 | 2/2012 | Jones et al. |
| 8,146,147 B2 | 3/2012 | Litvin et al. |
| 8,261,295 B1 | 9/2012 | Risbood et al. |
| 8,276,140 B1 | 9/2012 | Beda et al. |
| 8,296,459 B1 | 10/2012 | Brandwine et al. |
| 8,407,687 B2 | 3/2013 | Moshir et al. |
| 8,423,993 B2 | 4/2013 | Faus et al. |
| 8,468,535 B1 | 6/2013 | Keagy et al. |
| 8,484,353 B1 | 7/2013 | Johnson et al. |
| 8,504,844 B2 | 8/2013 | Browning |
| 8,533,796 B1 | 9/2013 | Shenoy et al. |
| 2002/0091902 A1 | 7/2002 | Hirofuji |
| 2002/0097747 A1 | 7/2002 | Kirkby |
| 2004/0139368 A1 | 7/2004 | Austen et al. |
| 2004/0148484 A1 | 7/2004 | Watanabe et al. |
| 2004/0210653 A1 | 10/2004 | Kanoor et al. |
| 2005/0010715 A1 | 1/2005 | Davies et al. |
| 2005/0166011 A1 | 7/2005 | Burnett et al. |
| 2005/0196030 A1 | 9/2005 | Schofield et al. |
| 2005/0216659 A1 | 9/2005 | Ogawa et al. |
| 2005/0237543 A1 | 10/2005 | Kikuchi |
| 2005/0289499 A1 | 12/2005 | Ogawa et al. |
| 2006/0026354 A1 | 2/2006 | Lesot et al. |
| 2006/0048077 A1 | 3/2006 | Boyles |
| 2006/0048130 A1 | 3/2006 | Napier et al. |
| 2006/0059228 A1 | 3/2006 | Kasamsetty et al. |
| 2006/0067236 A1 | 3/2006 | Gupta |
| 2006/0075199 A1 | 4/2006 | Kallahalla et al. |
| 2006/0098618 A1 | 5/2006 | Bouffioux |
| 2006/0136676 A1 | 6/2006 | Park et al. |
| 2006/0153099 A1 | 7/2006 | Feldman |
| 2006/0161753 A1 | 7/2006 | Aschoff et al. |
| 2006/0235795 A1* | 10/2006 | Johnson et al. ............... 705/44 |
| 2006/0271547 A1 | 11/2006 | Chen et al. |
| 2007/0011361 A1 | 1/2007 | Okada et al. |
| 2007/0112956 A1 | 5/2007 | Chapman et al. |
| 2007/0118694 A1 | 5/2007 | Watanabe et al. |
| 2007/0123276 A1 | 5/2007 | Parker et al. |
| 2007/0177198 A1 | 8/2007 | Miyata |
| 2007/0199058 A1 | 8/2007 | Baumgart et al. |
| 2007/0271604 A1 | 11/2007 | Webster et al. |
| 2007/0280243 A1 | 12/2007 | Wray et al. |
| 2008/0028389 A1 | 1/2008 | Genty et al. |
| 2008/0086515 A1 | 4/2008 | Bai et al. |
| 2008/0095176 A1 | 4/2008 | Ong et al. |
| 2008/0107112 A1 | 5/2008 | Kuo et al. |
| 2008/0205415 A1 | 8/2008 | Morales |
| 2008/0208681 A1 | 8/2008 | Hammad et al. |
| 2008/0215796 A1 | 9/2008 | Lam et al. |
| 2008/0222246 A1 | 9/2008 | Ebling et al. |
| 2008/0222375 A1 | 9/2008 | Kotsovinos et al. |
| 2008/0244030 A1 | 10/2008 | Leitheiser |
| 2008/0244471 A1 | 10/2008 | Killian et al. |
| 2008/0250407 A1 | 10/2008 | Dadhia et al. |
| 2008/0270704 A1 | 10/2008 | He et al. |
| 2008/0304516 A1 | 12/2008 | Feng et al. |
| 2008/0307258 A1 | 12/2008 | Challenger et al. |
| 2008/0313241 A1 | 12/2008 | Li et al. |
| 2009/0025074 A1* | 1/2009 | Le Saint et al. .................. 726/9 |
| 2009/0097657 A1 | 4/2009 | Schiedt et al. |
| 2009/0150629 A1 | 6/2009 | Noguchi et al. |
| 2009/0199177 A1 | 8/2009 | Edwards et al. |
| 2009/0222815 A1 | 9/2009 | Dake |
| 2009/0235358 A1 | 9/2009 | Tolba |
| 2009/0241108 A1 | 9/2009 | Edwards et al. |
| 2009/0249440 A1 | 10/2009 | Platt et al. |
| 2009/0276771 A1 | 11/2009 | Nickolov et al. |
| 2009/0282266 A1 | 11/2009 | Fries et al. |
| 2009/0300605 A1 | 12/2009 | Edwards et al. |
| 2009/0300641 A1 | 12/2009 | Friedman et al. |
| 2009/0310554 A1 | 12/2009 | Sun et al. |
| 2010/0017859 A1 | 1/2010 | Kelly |
| 2010/0023582 A1 | 1/2010 | Pedersen et al. |
| 2010/0046426 A1 | 2/2010 | Shenoy et al. |
| 2010/0057913 A1 | 3/2010 | DeHaan |
| 2010/0071035 A1 | 3/2010 | Budko et al. |
| 2010/0088335 A1 | 4/2010 | Mimatsu |
| 2010/0095000 A1 | 4/2010 | Kettler et al. |
| 2010/0199089 A1 | 8/2010 | Vysogorets et al. |
| 2010/0212004 A1 | 8/2010 | Fu |
| 2010/0215050 A1 | 8/2010 | Kanada |
| 2010/0217927 A1 | 8/2010 | Song |
| 2010/0235649 A1 | 9/2010 | Jeffries et al. |
| 2010/0274984 A1 | 10/2010 | Inomata et al. |
| 2010/0287548 A1 | 11/2010 | Zhou et al. |
| 2010/0293285 A1 | 11/2010 | Oishi et al. |
| 2010/0303241 A1 | 12/2010 | Breyel |
| 2011/0022812 A1 | 1/2011 | van der Linden et al. |
| 2011/0060882 A1 | 3/2011 | Efstathopoulos |
| 2011/0078363 A1 | 3/2011 | Yeh et al. |
| 2011/0153697 A1 | 6/2011 | Nickolov et al. |
| 2011/0153838 A1 | 6/2011 | Belkine et al. |
| 2011/0179412 A1 | 7/2011 | Nakae et al. |
| 2011/0191485 A1 | 8/2011 | Umbehocker |
| 2011/0191768 A1 | 8/2011 | Smith |
| 2011/0231280 A1 | 9/2011 | Farah |
| 2011/0246767 A1 | 10/2011 | Chaturvedi et al. |
| 2011/0258441 A1 | 10/2011 | Ashok et al. |
| 2011/0296157 A1 | 12/2011 | Konetski et al. |
| 2011/0302400 A1 | 12/2011 | Maino et al. |
| 2011/0302415 A1 | 12/2011 | Ahmad et al. |
| 2012/0063458 A1 | 3/2012 | Klink et al. |
| 2012/0084570 A1 | 4/2012 | Kuzin et al. |
| 2012/0084768 A1 | 4/2012 | Ashok et al. |
| 2012/0089981 A1 | 4/2012 | Tripathi et al. |
| 2012/0159634 A1 | 6/2012 | Haikney et al. |
| 2012/0173866 A1 | 7/2012 | Ashok et al. |
| 2012/0179796 A1 | 7/2012 | Nagaraj et al. |
| 2012/0185688 A1 | 7/2012 | Thornton et al. |
| 2012/0233678 A1 | 9/2012 | Pal |
| 2012/0233705 A1 | 9/2012 | Boysen et al. |
| 2012/0246637 A1 | 9/2012 | Kreeger et al. |
| 2012/0266159 A1 | 10/2012 | Risbood et al. |
| 2013/0074181 A1 | 3/2013 | Singh |
| 2013/0081014 A1 | 3/2013 | Kadatch et al. |
| 2013/0117801 A1 | 5/2013 | Shieh et al. |
| 2013/0212709 A1 | 8/2013 | Tucker |
| 2013/0227303 A1 | 8/2013 | Kadatch et al. |
| 2013/0262405 A1 | 10/2013 | Kadatch et al. |
| 2013/0276068 A1 | 10/2013 | Alwar |

OTHER PUBLICATIONS

Primet, Pascale, et al.., "HIPCAL: State of the Art of OS and Network virtualization solutions for Grids", Sep. 14, 2007, 38 pages.

Abdull, Alastairlrvine, et al. "Generic Routing Encapsulation", [online] [retrieved on Jan. 4, 2011]. Retrieved from the Internet: <URL: http://creativecommons.org/licenses/by-sa/3.0/>, 5 pages.

Farinacci et al., "RFC 2784: Generic Routing Encapsulation (GRE)", Mar. 2000, The Internet Society, 10 pages.

Kent et al., "RFC 4301: Security Architecture for the Internet Protocol", Dec. 2005, The Internet Society, 102 pages.

(56) References Cited

OTHER PUBLICATIONS

Wikipedia, "Domain Name System" [online]; Feb. 4, 2012; [Retrieved on Feb. 4, 2012]. Retrieved from the Internet: <URL: http://en.wikipedia.org/wiki/Domain_Name_System>, 16 pages.

Bucket Explorer. "What is my AWS Access and Secret Key." [Retrieved Apr. 26, 2011]. Retrieved from the Internet <URL: http://www.bucketexplorer.com/documentation/amazons3--what-is-my-aws-access-and-secret-key.html>, 1 page.

Hongkiat. "Amazon S3—The Beginner's Guide." [Retrieved on Apr. 26, 2011]. Retrieved from the Internet <URL: http://www.hongkiat.com/blog/amazon-s3-the-beginners-guide/>, 9 pages.

Myerson, Judith. "Creating Applications with Amazon EC2 and S3." O'ReillyOnLamp.com, May 13, 2008 [Retrieved on Apr. 26, 2011]. Retrieved from the Internet <URL: http://onlamp.com/pub/a/onlamp/2008/05/13/creating-applications-with-amazon-ec2-and-s3.html>, 8 pages.

Wikipedia. "OAuth." [online], Dec. 12, 2010; [Retrieved on Jan. 20, 2011] Retrieved from the Internet <URL: http://en.wikipedia.org/wiki/OAuth>; 3 pages.

Gowalla. "API Documentation—Oauth." [Retrieved on Apr. 26, 2011]. Retrieved from the Internet <URL: http://gowalla.com/api/docs/oauth>, 4 pages.

Apache HTTP Server Version 2.0. "Log Files." [Retrieved on Feb. 15, 2011]. Retrieved from the Internet <URL: http://httpd.apache.org/docs/2.0/logs.html>, 7 pages.

Microsoft Support. "How to view and manage event logs in Event Viewer in Windows XP." May 7, 2007, version 3.5 [Retrieved on Feb. 15, 2011]. Retrieved from the Internet <URL: http://support.microsoft.com/kb/308427>, 6 pages.

MSDN. "Visual Basic Concepts, Visual Studio 6.0: Centralized Error Handling." [Retrieved on Feb. 15, 2011]. Retrieved from the Internet <URL: http://msdn.microsoft.com/enus/library/aa240795(d=printer, v=vs.60).aspx>, 4 pages.

Laitinen, Aapo et al., Network Address Translation [Retrieved on Oct. 10, 2011] Retrieved from the Internet: <URL: http://en.wikipedia.org/wiki/Networkpages_Address_and_Port_Translation>, 11 pages.

Wikipedia., Anycast [Retrieved on Oct. 10, 2011] Retrieved from the Internet: URL<http://en.wikipedia.org/wiki/Anycast>, 5 pages.

VMCI Overview [Retrieved on Jun. 8, 2011] Retrieved from the Internet: <URL: http://pubs.vmware.com/vmci-sdk/VMCI_intro.html>, 3 pages.

VMware vSphere [Retrieved on Jun. 8, 2011] Retrieved from the Internet: <URL: http://www.vmware.com/products/vmotion/overview.html>, 2 pages.

Travostino, Franco, et al., Seamless Live Migration of Virtual Machines over the MAN/WAN, 2006, Elsevier Future Generation Computer Systems 2006, 10 pages.

VMCI Datagram API [Retrieved on Jun. 8, 2011], Retrieved from the Internet: <URL: http://pubs.vmware.com/vmci-sdk/datagram.html>, 1 page.

VMCI Datagram_SendTo [Retrieved on Jun. 8, 2011], Retrieved from the Internet: <URL: http://pubs.vmware.com/vmci-sdk/functions/VMCIDatagram_SendTo.html>, 1 page.

VMCIDs_Lookup [Retrieved on Jun. 8, 2011], Retrieved from the Internet: <URL: http://pubs.vmware.com/vmci-sdk/functions/VMCIDs_Lookup.html>, 2 pages.

Chen, Per M., et al., : "Maximizing Performance in a Striped Disk Array", 17th Annual International Symposium on Computer Architecture (SIGARCH 1990), 18 pages.

Sarhan, Nabil J., et al., "Caching and Scheduling in NAD-Based Multimedia Servers"; IEEE Computer Society, IEEE Transactions on Parallel and Distributed Systems, vol. 15, No. 10, Oct. 2004; pp. 921-933.

Vazhkudai, Sudharshan S., et al.; "Constructing Collaborative Desktop Storage Caches for Large Scientific Datasets"; ACM Journal Name, vol. V, No. N, Jun. 2006, 34 pages.

OMG, Deployment and Configuration of Component-based Distributed Applications Specification—Version 4.0, OMG, 2006, pp. 1-160.

Cala et al., "Automatic Software Deployment in the Azure Cloud", IFIP International Federation for Information Processing, 2010, pp. 1-14.

RSA Laboratories, "PKCS #11 v2.20: Cryptographic Token Interface Standard," Jun. 28, 2004, RSA Security Inc. (407 pages).

Amazon Auto Scaling-Getting Started Guide-API Version Aug. 1, 2010. Amazon Web Services LLC, 2010, 20 pages.

Amazon Auto Scaling—Developer Guide—API Version Aug. 1, 2010. Amazon Web Services LLC, 2011, 62 pages.

Amazon CloudWatch—Developer Guide—API Version Aug. 1, 2010. Amazon Web Services LLC, 2010, 75 pages.

Benincosa. "Ganglia and Nagios, Part 2: Monitor enterprise clusters with Nagios-Install Nagios to effectively monitor a data center; make Ganglia and Nagios work together," 2009, 20 pages.

'Nagios' [online]. "Monitoring Linux/Unix Machines," 2011, [retrieved on Feb. 3, 2011]. Retrieved from the Internet: URL: <http://nagios.sourceforge.net/docs/3_0/monitoring-linux.html > 1 page.

'Nagios' [online]. "Nagios Plugins," 2011, [retrieved on Feb. 3, 2011]. Retrieved from the Internet: URL: <http://nagios.sourceforge.net/docs/3_0/plugins.html > 2 pages.

'Zabbix' [online]. "Zabbix 1.8: The Ultimate Open Source Monitoring Solution," 2001-2012, [retrieved on Feb. 3, 2011]. Retrieved from the Internet: URL: <http://www.zabbix.com/features.php.> 1 page.

Amazon Elastic Compute Cloud, User Guide, API Version Mar. 1, 2012, pp. 97-103, downloaded from http://docs.amazonwebservices.com/AWSEC2/latest/UserGuide/AESDG-chapter-instancedata.html?r=4276 on Mar. 18, 2012.

Paravirtualization, Wikipedia Article, downloaded from http://en.wikipedia.org/wiki/Paravirtualization on Mar. 18, 2012.

Paravirtualized File Systems, Eric Van Hensbergen, downloaded from http://www.slideshare.net/ericvh/9p-on-kvm on Mar. 18, 2012.

"IPsec". Creativecommons.org [online]. Creative Commons Attribution-Share Alike 3.0 Unported, Nov. 11, 2010; [Retrieved on Jan. 14, 2011] Retrieved from the Internet: <URL: http://en.wikipedia.org/w/index.php?oldid=396193389>; pp. 1-8.

"Generic Routing Encapsulation". Creativecommons.org [online]. Creative Commons Attribution-Share Alike 3.0 Unported, Nov. 12, 2010; [Retrieved on Jan. 14, 2011]; Retrieved from the Internet: <URL: http://en.wikipedia.org/w/index.php?oldid=396280384>; pp. 1-5.

Cloud Computing Course, Part 2: Amazon's EC2, Marcel Gagne, Jun. 13, 2011. Retrieved from the Internet: <URL: http://marcelgagne.com/content/cloud-computing-course-part-2-amazons-ec2>, 6 pages.

How to: Getting Started With Amazon EC2, Paul Stamatiou, Apr. 5, 2008. Retrieved from the Internet: <URL:http//paulstamatiou.com/how-to-getting-started-with-amazon-ec2>, 25 pages.

Uploading Personal ssh Keys to Amazon EC2, Eric Hammond, Oct. 14, 2010. Retrieved from the Internet: <URL:http://alestic.com/2010/10/ec2-ssh-keys>, 3 pages.

Key Management in Cloud Datacenters, Security Stackexchange.com, Retrieved from the Internet on Nov. 18, 2011; Retrieved from: <URL: http://security.stackexchange.com/questions/2514/key-management-in-cloud-datacenters>, 2 pages.

Managing Amazon EC2—SSH Login and Protecting Your Instances, Everyday's Findings, Monday, May 18, 2009, Retrieved from the Internet on Nov. 18, 2011; Retrieved from: <URL: http://blog.tag-gesell.de/index.php?/aarchives/73-Managing-Amazon-EC2., 6 pages.

Using and Managing AWS—Part 6: SSH Key Pairs, Top WordPress, May 26, 2009, Retrieved from the Internet: <URL: http://clouddb.info/2009/05/26/using-and-managingaws-part-6-ssh-key-pairs>, 5 pages.

Live Migration of Virtual Machines, Clark et al., University of Cambridge Laboratory, Department of Computer Science; University of Copenhagen, Denmark, 2005; 14 pages.

Making Services Easy to Migrate, Debian Administration, System Administration Tips and Resources, Jan. 1, 2005, 5 pages.

L. Gommans, et al., Token-Based Authorization of Connection Oriented Network Resources, 1st International Workshop on Networks for Grid Applications (Grid Nets 2004), Oct. 29, 2004; 8 pages.

(56) References Cited

OTHER PUBLICATIONS

Hyun, Ahn Ji, Authorized Officer for Korean Intellectual Property Office, International Search Report and Written Opinion for PCT/US2012/021846, International Search Report completed May 25, 2012, 8 pages.

Na, Lee Da, Authorized Officer for Korean Intellectual Property Office, International Search Report and Written Opinion for PCT/US2012/020954, International Search Report completed Aug. 23, 2012, 10 pages.

Alpern, B., "The Jalapeno virtual machine," IBM Systems Journal, Jan. 2000, vol. 39, Issue 1, pp. 211-238.

Bok, Jin Yo, Authorized Officer for Korean Intellectual Property Office, International Search Report and Written Opinion for PCT/US2012/029210, International Search Report completed Oct. 10, 2012, 2 pages.

Anonymous, Storage I/O Control Technical Overview and Consideration for Deployment VMware vSphere™ 4.1, Jan. 1, 2010, XP055044491, retrieved from the internet: URL: http://www.vmware.com/fled/pdf/techpaper/WMW-vSphere41-SIOC.pdf; [retrieved on Nov. 21, 2012], the entire document.

Cabellos et al., LISPmob: Mobile Networking through LISP, Apr. 2, 2012, 8 pages.

Steinmetz, Christof, Authorized Office for European Patent Office, International Search Report and Written Opinion for PCT/US2013/034140, completed Jun. 25, 2013, 21 pages.

Hehn, Eva, Authorized Office for European Patent Office, International Search Report and Written Opinion for PCT/US2013/027456, completed Jun. 24, 2013,11 pages.

Eng, Lili, Australian Government, IP Australia, Examiners First Report for 2012200562, dated Jun. 4, 2012, 2 pages.

\* cited by examiner

VIRTUAL MACHINE SERVICE ACCESS

CROSS-REFERENCE TO RELATED APPLICATION

Under 35 U.S.C. §119, this application claims the benefit of and priority to prior U.S. provisional application 61/581,993, filed on Dec. 30, 2011, which is incorporated in its entirety herein by reference.

BACKGROUND

This patent document relates to digital data processing and, in particular, to virtual machine communication security.

Cloud computing is network-based computing in which typically large collections of servers housed in data centers or "server farms" provides computational resources and data storage as needed to remote end users. Some cloud computing services allow end users to run user-provided server software applications (e.g., e-commerce server applications, web servers, or file servers) in the cloud. Some other cloud computing services provide access to software applications such as word processors and other commonly used applications to end users who interface with the applications through web browsers or other client-side software. Users' electronic data files are usually stored in the server farm rather than on the users' computing devices. Maintaining software applications and user data on the server farm may simplify management of end user computing devices. Some cloud computing services allow end users to execute software applications in virtual machines. Access to cloud computing services may be limited to users who are authorized to access the cloud computing services.

SUMMARY

Particular embodiments of the subject matter described in this specification can be implemented so as to realize one or more of the following advantages. A virtual machine may access services without having direct access to long term credentials. Security may be improved. Credentials that are provided to the VM may be time limited. Access to services may be time limited. Credentials may be added or revoked at run time.

In general, one innovative aspect of the subject matter described in this specification can be embodied in methods that include the actions of receiving a plurality of requests for long-term security tokens from a host machines, each request comprising authentication information for a respective service account. The methods include the actions of providing one or more of the long-term security tokens to host machine based on the requests, wherein the one or more long-term security tokens can be used to generate short-term security tokens for a virtual machine executing on the host machine, wherein a virtual machine is a hardware virtualization on the host machine and cannot access the one or more long-term security token provided to the host machine. The methods also include the actions of generating by a process executing in a host operating system of the host machine a respective short-term security token based on a long-term security token of the one or more long-term security tokens for use by a virtual machine executing on the host machine to access one of the respective service accounts, wherein the short-term security token is useable for a pre-determined amount of time Other embodiments of this aspect include corresponding computer systems, apparatus, and computer programs recorded on one or more computer storage devices, each configured to perform the actions of the methods. A system of one or more computers can be configured to perform particular actions by virtue of having software, firmware, hardware, or a combination of them installed on the system that in operation causes or cause the system to perform the actions. One or more computer programs can be configured to perform particular actions by virtue of including instructions that, when executed by data processing apparatus, cause the apparatus to perform the actions.

The foregoing and other embodiments can each optionally include one or more of the following features, alone or in combination a particular request of the plurality of requests may include scope information and wherein the scope information identifies limits of access to one of the respective service accounts. A distinct long-term security token may be provided for each service account and corresponding scope information. Providing the one or more long-term security tokens may include determining that a long-term security token is not available for a respective service account and generating the long-term security token. The process executing in the host operating system may execute in user process space of the host operating system. The methods may also include the actions of receiving a request to modify service accounts associated with a virtual machine executing on a host machine, obtaining a long-term security token based on the request, and providing the long-term security token to the host machine. The methods may also include the action of receiving a request for the respective short-term access token from the virtual machine. The request may be received by a virtualized network service.

The details of one or more embodiments of the subject matter of this specification are set forth in the accompanying drawings and the description below. Other features, aspects, and advantages of the subject matter will become apparent from the description, the drawings, and the claims.

BRIEF DESCRIPTION OF THE DRAWINGS

Like reference numbers and designations in the various drawings indicate like elements.

DETAILED DESCRIPTION

Figure 1A:
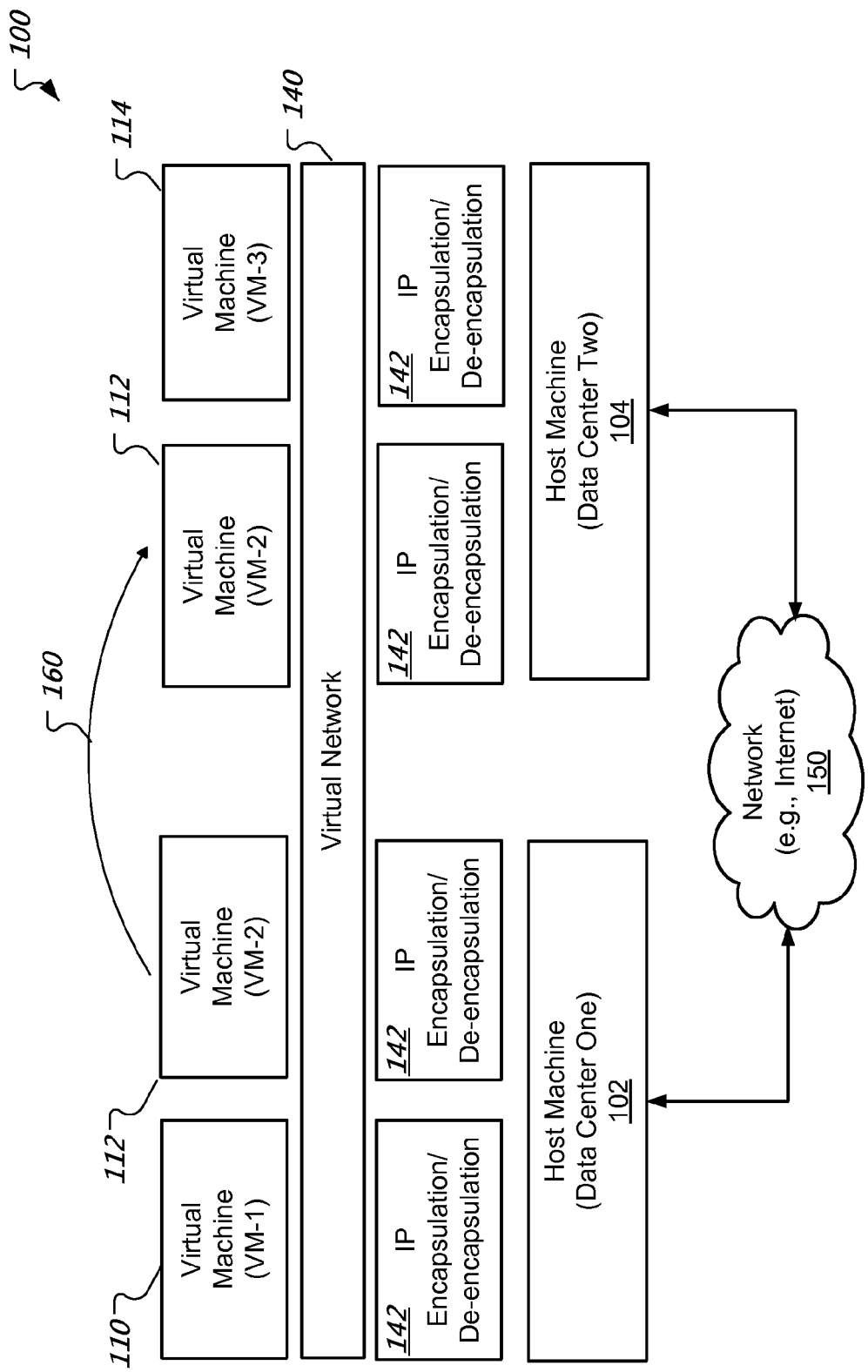
FIG. 1A shows an example of a distributed system that runs multiple virtual machine instances over a geographically distributed virtual network.

FIG. 1A shows an example of a distributed system that runs multiple virtual machine instances over a geographically distributed virtual network. A distributed system 100 can run virtual machines (VMs) 110, 112, 114, on host machines 102, 104. Elements of the distributed system 100 can reside in different physical locations. For example, a first host machine 102 can reside in a first data center, while a second host machine 104 can reside in a second data center. In some implementations, these data centers can be located in different geographic locations such as different states or countries.

The distributed system 100 can provide a virtual network 140 to the virtual machines 110, 112, 114 for Internet Protocol (IP) based communications. The VMs 110, 112, 114 are assigned network addresses (e.g., an IPv4 address or IPv6 address) that are routable on a virtual network 140. In some implementations, the virtual network 140 includes a private subnet (e.g., 192.168.0.0/16, 10.0.0.0/8).

In some implementations, IP traffic on the virtual network 140 is carried by IP tunnels. Host machines 102, 104 perform IP encapsulation and de-encapsulation 142 for IP traffic to and from each VM 110, 112, 114. An IP tunnel provides a transport layer. For example, IP tunneling can include sending an IP tunnel packet that includes an encapsulated packet. The encapsulated packet can be an IP packet. Other types of encapsulated packets are possible. In some cases, an IP tunnel can both originate and terminate on the same host machine (e.g., source and destination VMs are on the same host machine). In some cases, an IP tunnel can originate at one host machine and terminate at a different host machine (e.g., source and destination VMs are on different host machines). IP tunnel traffic between the host machines 102, 104 can be carried over a virtual private network (VPN) via a network 150 such as the Internet or a data center network walled off from the Internet.

Based on the virtual network 140 spanning multiple host machines 102, 104 in geographically separate areas, VM migration can occur with minimal or zero disruption to IP traffic from or to a VM migrated that has been migrated between geographically separate areas. For example, a VM 112 can be migrated 160 from a first host machine 102 at a first location to a second host machine 104 at a second location. Endpoints for the tunnels associated with VM 112 can be updated to reflect the change in the host machine. In some implementations, the host machines 102, 104 can run multiple virtual networks. For example, two virtual machines can be on the same physical machine, but attached to different virtual networks. Furthermore, a virtual machine can have one or more virtual network interface cards (NICs) that are attached to one or more virtual networks. Each virtual network interface can be assigned a network address (e.g., IPv4 address, IPv6 address, or a layer 2 Media Access Control address). In some implementations, a virtual machine stores virtual network addresses and their associated network identifiers.

Figure 1B:
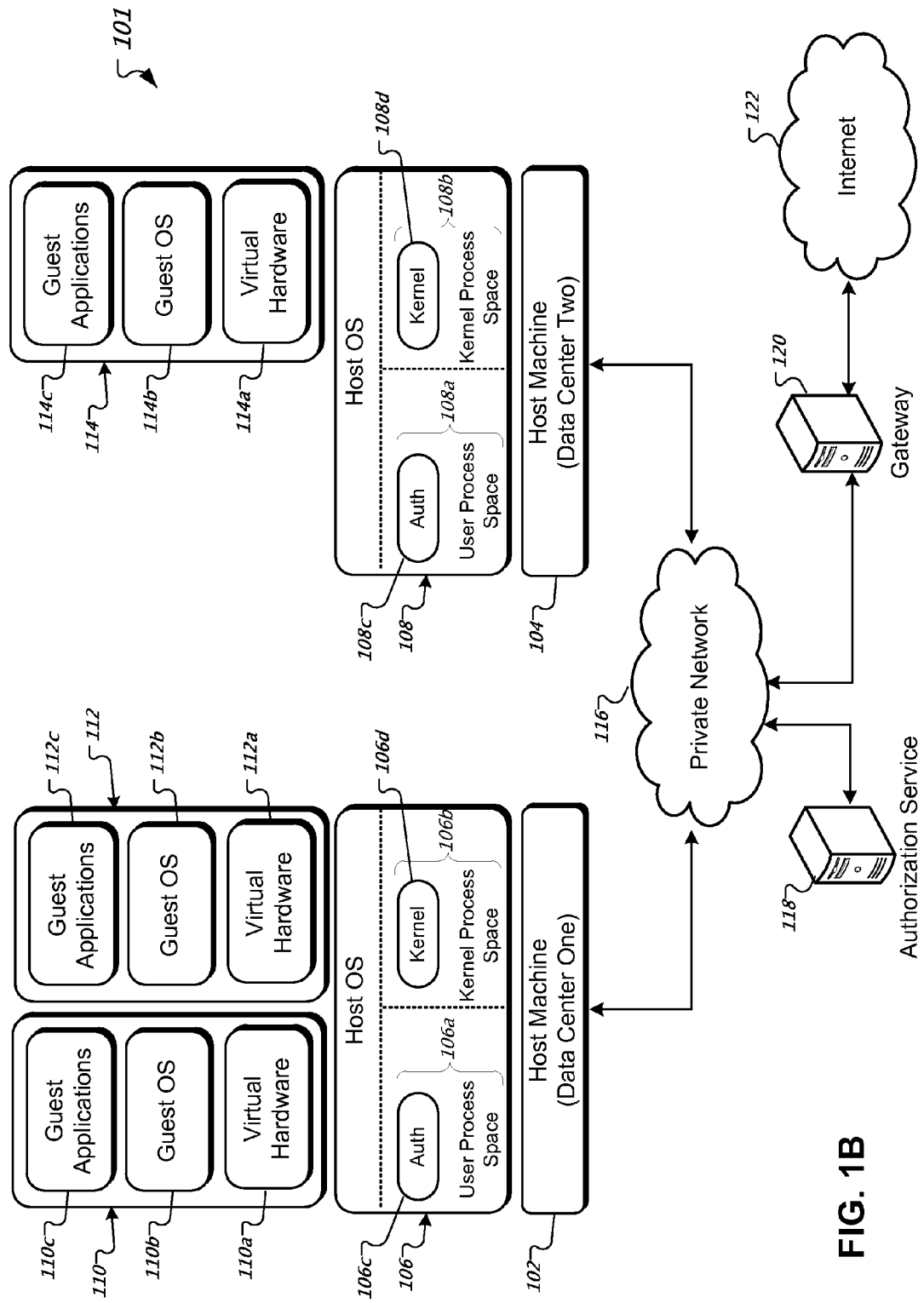
FIG. 1B shows another example of a distributed system that runs multiple virtual machine instances over a geographically distributed virtual network.

FIG. 1B shows another example of a distributed system that runs multiple virtual machine instances over a geographically distributed virtual network. Host machines 102, 104 included in a distributed system 101 can contain one or more data processing apparatuses such as rack mounted servers or other computing devices. Host machines 102, 104 can have different capabilities and computer architectures. Host machines 102, 104 can communicate with each other through a network such as a private network 116 (e.g., dedicated or leased optical fiber or copper wires). Host machines 102, 104 can also communicate with devices on external networks, such as the Internet 122, through one or more gateways 120 which are data processing apparatuses responsible for routing data communication traffic between the private network 116 and the Internet 122. Other types of external networks are possible.

The private network 116 can include one or more wired (e.g., Ethernet) or wireless (e.g., WI-FI) networks. In some implementations, the private network 116 includes physical communication assets such as optical fiber or copper wire that connect two data centers. In some implementations, the private network 116 is implemented over an external network such as the Internet 122. In some implementations, data centers have respective local area networks (LANs) that are aggregated together to form a private network 116. IP traffic between data centers can be routed, for example, by using Multiprotocol Label Switching (MPLS). Other types of routing are possible.

Each host machine 102, 104 executes a host operating system 106, 108. A host operating system 106, 108 manages host machine resources. In this example, host operating systems 106, 108 run software that virtualizes the underlying host machine hardware and manages concurrent execution of one or more VMs. For example, the host operating system 106 manages two VMs (VM 110 and VM 112), while a different host operating system 108 manages a single VM 114. A host machine can, in general, manage larger quantities of virtual machines, however, the quantity may be limited based on physical resources of the host machine.

The VMs 110, 112, 114 use a simulated version of an underlying host machine hardware, which can be referred to as virtual hardware (e.g., virtual hardware 110a, 112a and 114a). In some implementations, the VMs 110, 112, 114 can be used to simulate other hardware configurations including hardware that is different from the hardware of the underlying host machine. Software that is executed by the virtual hardware can be referred to as guest software. In some implementations, guest software cannot determine if it is being executed by virtual hardware or by a physical host machine. If guest software executing in a VM, or the VM itself, malfunctions or aborts, other VMs executing on the host machine will not be affected. A host machine's microprocessor(s) can include processor-level mechanisms to enable virtual hardware to execute software applications efficiently by allowing guest software instructions to be executed directly on the host machine's microprocessor without requiring code-rewriting, recompilation, or instruction emulation.

Each VM (e.g., VMs 110, 112 and 114) is allocated a set of virtual memory pages from the virtual memory of the underlying host operating system and is allocated virtual disk blocks from one or more virtual disk drives for use by the guest software executing on the VM. For example, host operating system 106 allocates memory pages and disk blocks to VM 110 and VM 112, and host operating system 108 does the same for VM 114. In some implementations, a given VM cannot access the virtual memory pages assigned to other VMs. For example, VM 110 cannot access memory pages that have been assigned to VM 112. A virtual disk drive can be persistent across VM restarts. In some implementations, virtual disk blocks are allocated on physical disk drives coupled to host machines. VMs can be allocated network addresses through which their respective processes can communicate with other processes via a virtual network. For example, guest software executing on VM 110 can communicate with guest software executing on VM 112 or VM 114 via the virtual network using the allocated network addresses.

A VM's guest software can include a guest operating system (e.g., guest operating systems 110b, 112b and 114b) which is software that controls the execution of respective guest software applications (e.g., guest applications 110c, 112c and 114c), within the VM and provides services to those applications. For example, a guest operating system can be an operating system such as a variant of the UNIX operating system. Other operating systems are possible. Each VM can execute the same guest operating system or different guest operating systems. Booting a VM can include using a virtual boot disk to load a kernel image associated with a guest operating system into memory. A guest operating system's access to resources such as networks and virtual disk storage is controlled by the underlying host operating system.

By way of illustration, and with reference to virtual machine 110, when the guest application 110c or guest operating system 110b attempts to perform an input/output operation on a virtual disk, initiate network communication, or perform a privileged operation, for example, the virtual hardware 110a is interrupted so that the host operating system 106 can perform the action on behalf of the virtual machine 110. The host operating system 106 can perform these actions with a process that executes in kernel process space 106b, user process space 106a, or both.

The kernel process space 106b is virtual memory reserved for the host operating system 106's kernel 106d which can include kernel extensions and device drivers. The kernel process space has elevated privileges (sometimes referred to as "supervisor mode"); that is, the kernel 106d can perform certain privileged operations that are off limits to processes running in the user process space 106a. Examples of privileged operations include access to different address spaces, access to special functional processor units in the host machine such as memory management units, and so on. The user process space 106a is a separate portion of virtual memory reserved for user mode processes. User mode processes cannot perform privileged operations directly.

In various implementations, authorization and authentication to services is provided by a virtual machine authorization process (e.g. the virtual machine authorization process 106c). In some implementations, the virtual machine authorization process executes in the user process space (e.g., user process space 106a) of a host operating system (e.g., host operating system 106). In other implementations, the virtual machine authorization process can execute in the kernel process space (e.g., kernel process space 106d) of the host operating system.

The virtual machine authorization process 106c, 108c can communicate with an authorization service 118 to provide access to services. For example, the authorization service may provide a virtual machine with access to a cloud storage system.

Figure 2:
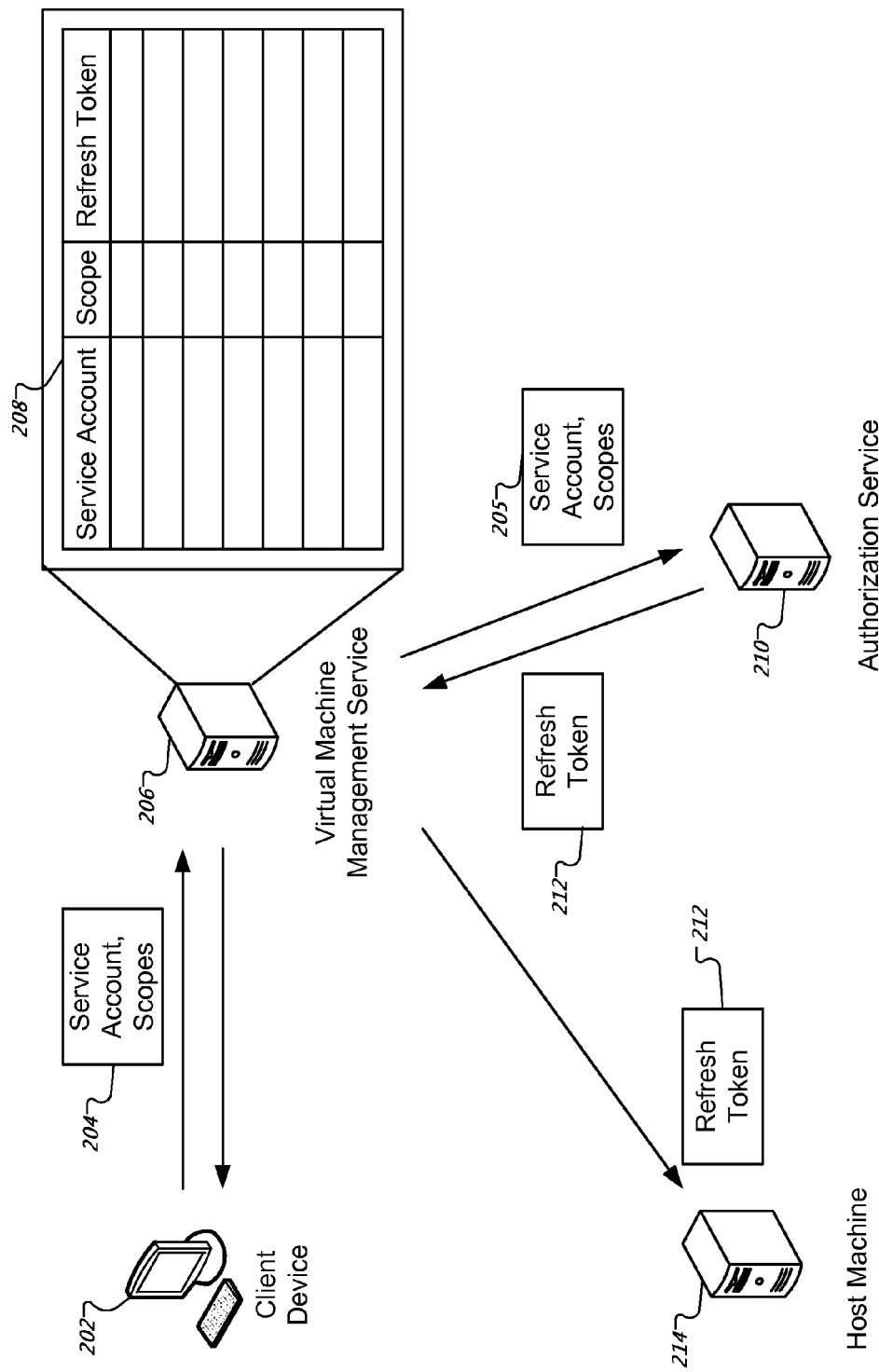
FIG. 2 shows an example of starting a virtual machine based on a user request.

FIG. 2 shows an example of starting a virtual machine based on a user request. A client device 202 sends one or more requests 204 to a virtual machine management service 206 to start a new virtual machine. The request 204 can include one or more credentials for the VM. In some implementations, a default set of credentials can be used is the request does not include any credentials. In general, a credential is an attestation of qualification, competence, or authority issued to the VM by an authorization server. For example, a credential may be a long-term security token for a service account provided by the authorization server. A service account is a set of credentials that allow software to act as a user when talking to application programming interface (API) endpoints. For example, a service account may have access to a cloud storage service, a calculation service, or an enterprise application.

In some implementations, a service account has an access control list (ACL) indicating which users can generate refresh tokens for that service account. The permissions are established such that the users who can launch VMs are the same users that can 'act as' the service account.

The request 204 can include one or more service accounts and one or more scopes associated with the service account. A scope is a mechanism for segmenting the permissions associated with a service account. A service account may have the ability to access a service in different manners (for example, the service account can access a cloud storage service with read/write scope or read-only scope). For example, the request 204 may specify that the virtual machine is to have access to the cloud storage service (a cloud storage service account), but limited to read only access (a read-only scope).

The virtual machine management service 206 determines if a long-term security token exists for each requested service account and corresponding set of scopes in the request 204. A virtual machine management service is a service that coordinates and controls the lifecycle of the virtual machine. The virtual machine management service is starts virtual machines, monitors the health of the virtual machine, and may coordinate shutting down the virtual machine. The virtual machine management service 206 may store long-term security tokens in a cache, represented in FIG. 2 as a table 208. A long-term security token is a credential provided by an authorization server that permits a virtual machine to use a service account. Generally, the long-term security token is valid for an indefinite period, but may be revoked by an authorization server. In some implementations, the long-term security token may expire after a relatively long period of time (for example, a day, two days, a week). A long-term security token may be an alpha numeric sequence of characters that is used by an authorization server to authenticate a service account. Other types of long-term security tokens are possible. A long-term security tokens may be, for example, a refresh token or credentials used to obtain access tokens. Refresh tokens are issued to the client by the authorization server and are used to obtain a new access token when the current access token becomes invalid or expires, or to obtain additional access tokens with identical or narrower scope (access tokens may have a shorter lifetime and fewer permissions than authorized by the resource owner).

If the virtual machine management service 206 determines that a long-term security token for the service account and corresponding set of scopes does not exist, the virtual machine management service sends the credentials in a request 205 to an authorization service 210. The authorization service controls access to services by providing and verify the validity of credentials, such as long-term security tokens.

The authorization service 210 generates one or more long-term security tokens 212 for the requested service accounts and any corresponding set of scopes, and sends the generated long-term security tokens 212 in a response to the virtual machine management service 206. In some implementations, a long-term security token is shared by two or more service accounts. The virtual machine management service 206 stores the long-term security tokens 212 in the cache for later access.

In some implementations, there is not a trust relationship between the authorization service 210 and the virtual machine management service 206. The authorization service 210 may only provide a long-term security token if the virtual machine management service 206 demonstrates that there is a user actively requesting for the long-term security token. For example, by forwarding cryptographic proof derived from when the user authorizations with the virtual machine management service 206.

If the virtual machines that implement a service account do so for a same set of scopes, the virtual machines can share the same long-term security token. For example, a new VM starts with the authority to act as a service account and set of scopes that has a long-term security token assigned, the assigned long-term security token is provided to the host operating system of the VM.

The virtual machine management service 206 sends the long-term security token 212 to the host machine 214 that will execute the virtual machine. In some implementations, the host machine 214 starts the virtual machine and a corresponding virtual machine authorization process (not shown). The long-term security token is stored on the Host machine by the virtual machine authorization process. The virtual machine authorization process restricts the VM from accessing the long-term security token, as will be described below.

Figure 3:
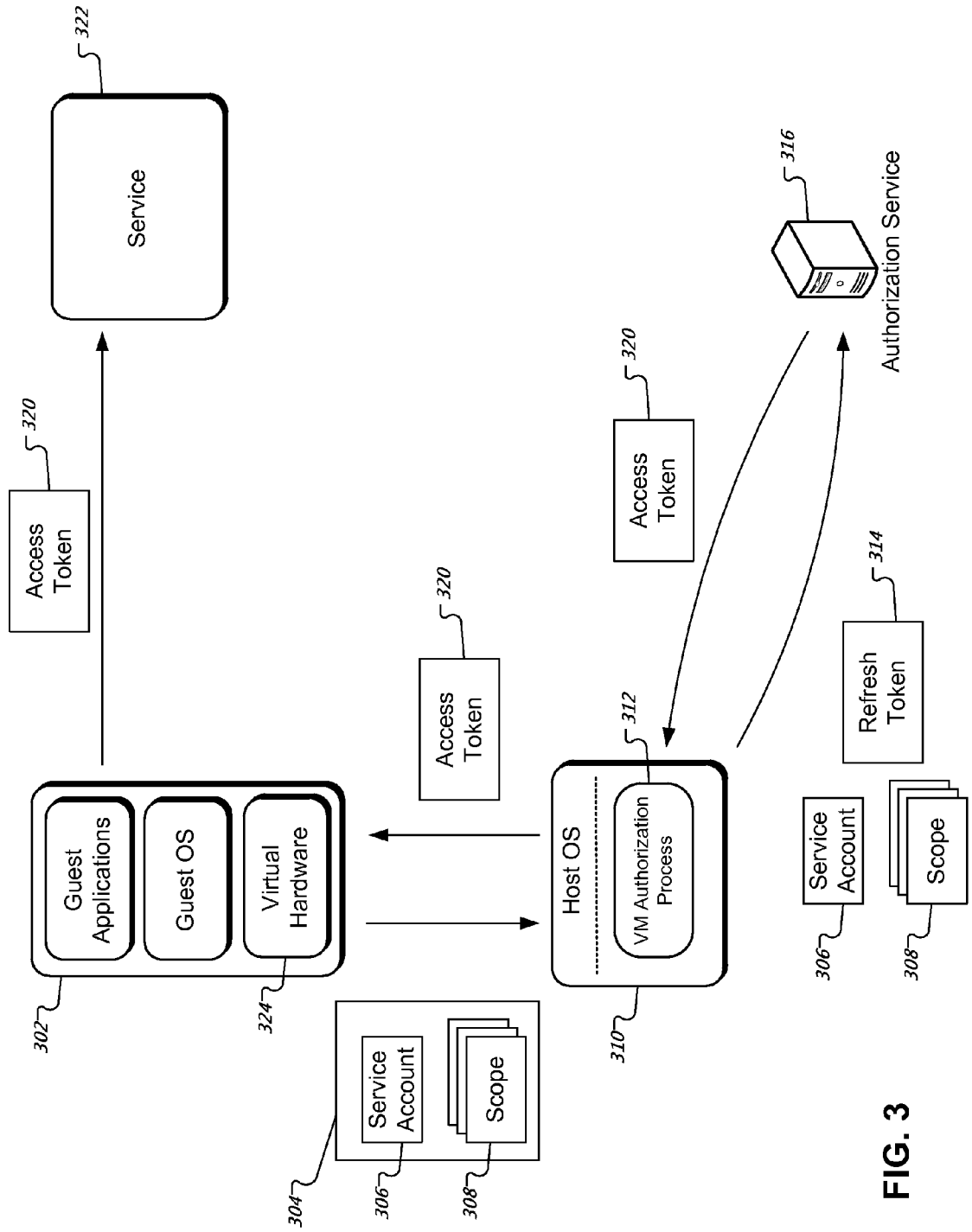
FIG. 3 shows an example of a virtual machine obtaining a short-term security token for a service.

FIG. 3 shows an example of a virtual machine obtaining a short-term security token for a service. A short-term security token is a time limited token that permits the VM access to a specific service for a limited period of time, for example, one minute, ten minutes, one hour, or one day. Short-term security tokens are credentials used to access protected resources. The short-term security tokens can also be limited in scope and can only be used to access select services allowed by the corresponding scope. The short-term security token can be, for example, an alpha-numeric string. Other types of short-term security tokens are possible.

A VM 302 requests access to a service 322 by sending a request 304 to the host operating system 310 of the host machine on which the VM 302 executes. The request 304 includes a service identifier 306 that identifies the service to be accessed and one or more scopes 308 associated with the request. In general, a scope is a parameter that specifies a type of access requested. Scopes may vary from service to service. A scope may represent, for example, a role in a role-based security system or may otherwise specify a level of access, such as read-only or read/write access. In some implementations, the request does not include scopes. In some implementations, the request 304 includes a service account under which the VM 302 is requesting access.

The VM 302 may send the request to a virtual machine authorization process 312 executing on the host operating system 310. In some implementations, each VM is associated with a distinct virtual machine authorization process 312. The VM 302 can send a query to the virtual machine authorization process 312 to obtain a list of service accounts and corresponding scopes as to which the VM 302 is authorized to act.

The virtual machine authorization process 312 may expose a Hypertext Transfer Protocol (HTTP) interface to the VM 302. In some implementations, the HTTP interface is protected so that only virtual machines executing on the same host machine as the virtual machine authorization process can access the HTTP interface. In some implementations the virtual machine authorization process 312 may be accessed using a virtualized network service. For example, a virtual network interface of the virtual hardware 324 receives an HTTP request directed to an IP address associated with virtual machine authorization processes. The virtual hardware 324 intercepts the request and redirects it to the virtual machine authorization process 312 associated with the VM 302.

The virtual machine authorization process 312 identifies the long-term security token associated with the service account 306 and set of scopes 308. The virtual machine authorization process 312 stores long-term security tokens associated with each service account associated with the virtual machine. The long-term security token is issued to the VM by an authorization service, for example, when the VM is created. In general, long-term security tokens can be used to obtain short-term security tokens which in turn can be used to access services. In some implementations, the virtual machine authorization process 312 restricts the VM 302 from directly accessing the long-term security token. In various implementations, the long-term security token is not exposed or supplied to the VM but is instead stored in the user process space of the host operating system 310. Short-term security tokens may be, for example, credentials used to access protected resources. An access token is a string representing an authorization issued to the client. The string is usually opaque to the client. Tokens represent specific scopes and durations of access, granted by the resource owner, and enforced by the resource server and authorization server.

In some implementations, the VM 302 may be associated with one or more service accounts. A service account may be a specialized account that has access to a particular set of services. The services may include, for example, the service 322. Service accounts may be associated with the VM 302 when the VM 302 is started, or may be added at a later time. For example, when launching a virtual machine, a user may specify a list of service accounts. For each service account, the user may be able to specify a set of scopes.

Each service account may have its own long-term security token. In implementations where the user specifies a set of scopes for a long-term security token, each service account and corresponding set of scopes may have its own long-term security token.

The virtual machine authorization process 312 sends the long-term security token 314 and the service identifier 306 to an authorization service 316. The authorization service verifies that the long-term security token has the right to access the identified service 322 and the supplied scopes 308. The authorization service then generates a short-term security token 318.

In implementations where multiple VMs share a common long-term security token, the virtual machine management service (e.g., VMM service 206 in FIG. 2) keeps track of which VMs that have access to the long-term security token. When no VM with the long-term security token remains active, for example, when all the VMs have been shut down, the long-term security token is revoked by making a request to the authorization service.

The short-term security token 318 is supplied to the virtual machine authorization process 312 which, in turn, supplies it to the VM 302. Allowing a VM access to short-term security tokens presents less security risk than allowing the VM access to long-term security tokens. A short-term security token is limited in time, that is, the short-term security token expires after a period, for example, one hour.

In scenarios where the VM does not have authorization to access the service, the authorization service 322 provides an error to the virtual machine authorization process 312. In turn, the virtual machine authorization process sends an error to the VM. For example, the virtual machine authorization process 312 may send an HTTP 403 error.

The VM sends the short-term security token 320 to the service 322, for example, as part of an HTTP header. The service then allows the VM 302 access to the service 322.

Figure 4:
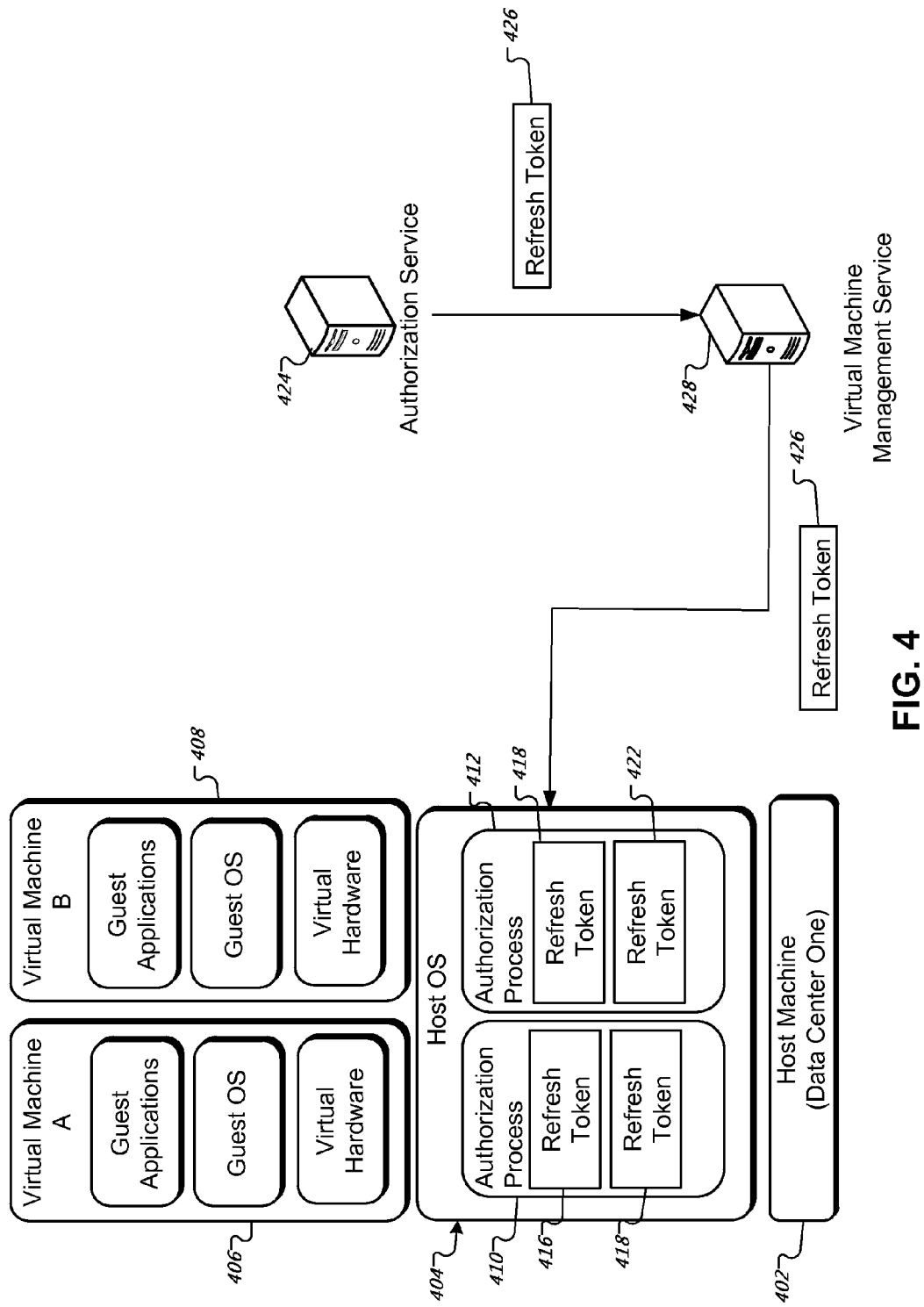
FIG. 4 shows an example of an authorization service updating long-term security tokens.

FIG. 4 shows an example of an authorization service updating long-term security tokens. In some implementations, an authorization service 424 determines to revoke a long-term security token. The authorization service 424 revokes the long-term security token and rejects any subsequent request from a virtual machine authorization process using the long-term security token.

In other implementations, the virtual machine management service 418 can provide updated long-term security tokens to virtual machine authorization processes. For example, a host machine 402 is running VM A 406 and VM B 408. The host machine 402 includes a host operating system 404. The host operating system 404 includes a virtual machine authorization process 410 associated with VM A 406 and a virtual machine authorization process 412 associated with VM B 408. The virtual machine authorization process 410 stores long-term security tokens 416, 418 for the VM A

406. The virtual machine authorization process 412 stores long-term security tokens 418, 422 for the VM B 408.

The virtual machine management service 428 includes a list of all VMs that have been provided the long-term security token 418. In this example, the list includes VM A 406 and VM B 408. The virtual machine management service 428 provides the updated token 418 to the virtual machine authorization process 410 associated with VM A 406, and the virtual machine authorization process 412 associated with VM B 408.

Figure 5A:
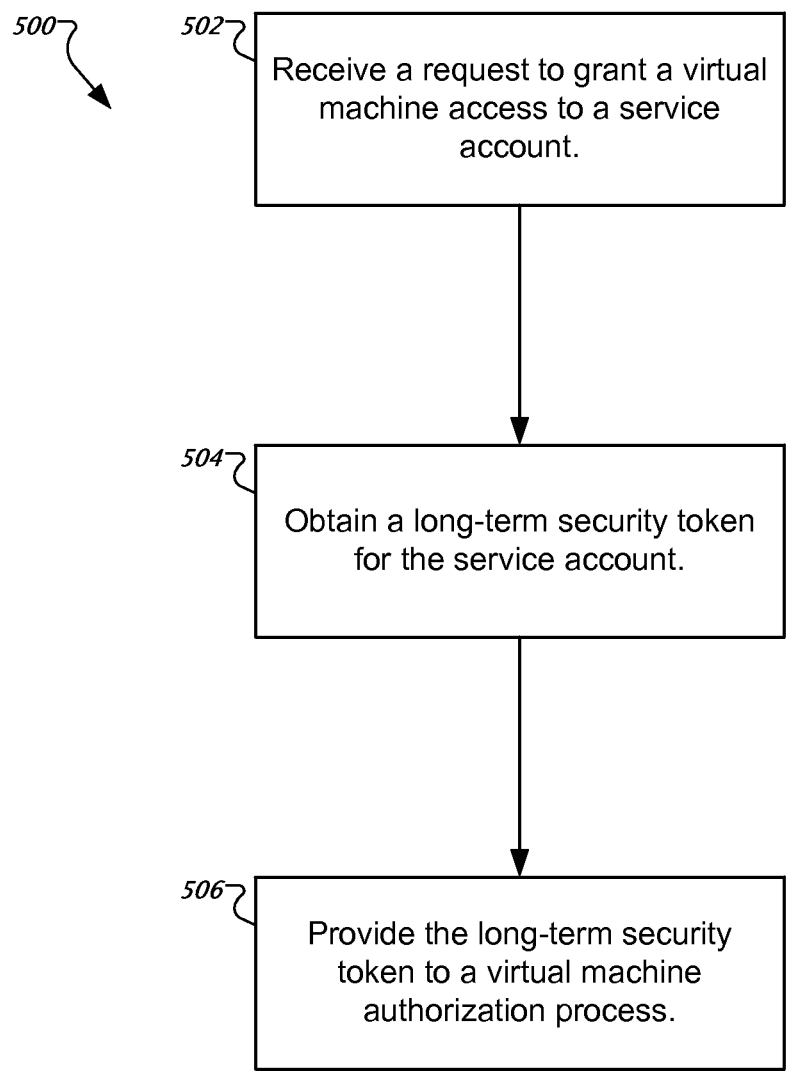
FIGS. 5A-B illustrate an example of a process for obtaining long-term security tokens.
Figure 5B:
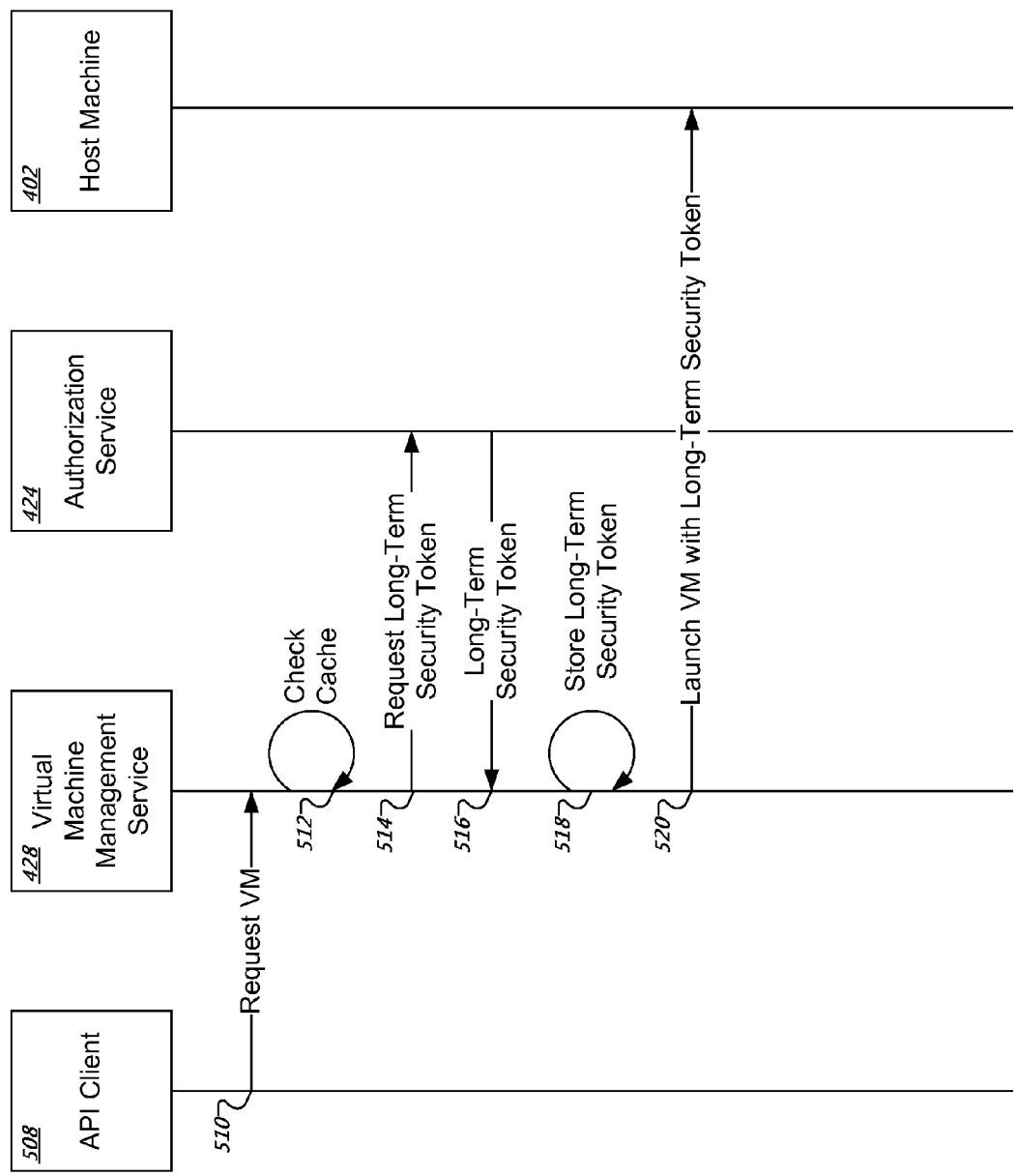

FIGS. 5A-B illustrate of an example of a process for obtaining long-term security tokens. FIG. 5A is a flow chart of an example of a process 500 for obtaining long-term security tokens. The process may be performed by a computer system, for example, the Virtual Machine Management Service 428 of FIG. 4 or other computer system. The process 500 will be described in relation to a system performing the process. FIG. 5B is a sequence diagram illustrating an example of a computer system executing the process 500.

Referring to FIG. 5A, the process 500 receives 502 a request to grant a virtual machine access to a service account (e.g. a virtual machine management service may receive the request). The service account may be authorized to access a service, for example, a service provided by a cloud computing environment. The request may further limit the access of the virtual machine a set of scopes for the service account. For example, the request may limit the virtual machine to read-only access to services accessible by the service account. In one implementation, referring to FIG. 5B an API client 508 requests 510 a VM from a virtual machine management service 428. The service accounts and scopes may be provided as part of the request.

The process 500 obtains 504 a long-term security token for the service account (e.g., the virtual machine management service may obtain the long-term security token). In some implementations, the process may store long-term security tokens for service accounts in a data cache. In one implementation, referring to FIG. 5B, the virtual machine management service 428 checks 512 a cache to determine if a long-term security token is available for the particular service account and set of scopes (if applicable). If such a security token is not available, the virtual machine management service 428 may request 514 a long-term security token for the service account, and any provided set of scopes, from an authorization service 424. After verifying the request, the authorization service 424 provides 516 the long-term security token to the virtual machine management service 428. The virtual machine management service 428 may store 518 the long-term security token in its cache.

The process 500 provides 506 the long-term security token to a virtual machine authorization process (e.g. the virtual machine management service may provide the long-term security token to the virtual machine authorization process). The virtual machine authorization process restricts the virtual machine from directly accessing the long-term security token. Instead, the virtual machine authorization process acts as an intermediary when the virtual machine requests access to a service as discussed below with respect to FIG. 6. In one implementation, the virtual machine management service 428 launches 520 a VM on a host machine 402 with the long-term security token. The host machine may establish a authorization process for the VM and store the long-term security token within the authorization process.

In some implementations, the virtual machine authorization process is not executed by the virtual machine. For example, the virtual machine authorization process may execute in the user process space of the operating system of the virtual machine's host machine. In some implementations, each virtual machine authorization process is used by one and only one virtual machine.

Figure 6A:
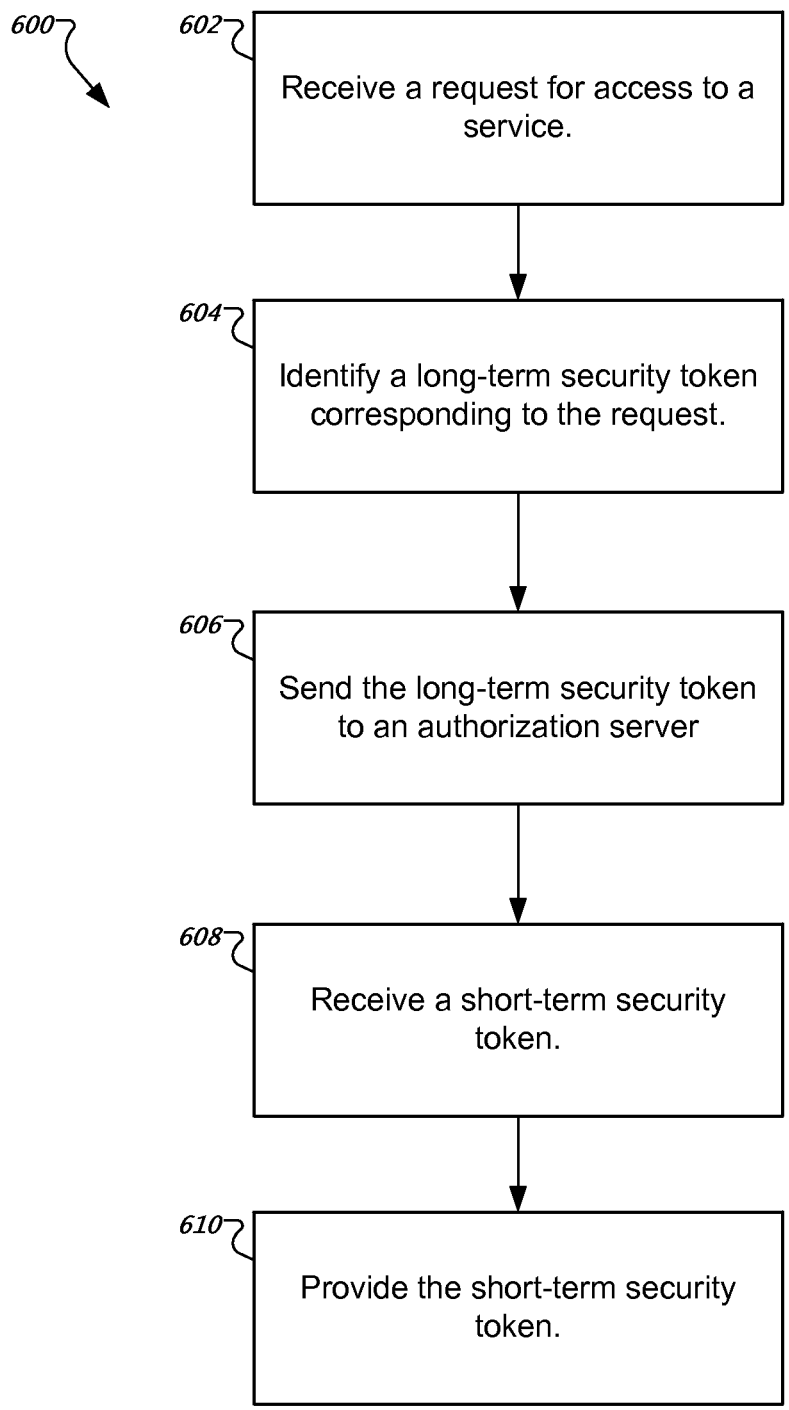
FIGS. 6A-B illustrate an example of a process whereby a virtual machine accesses a service.
Figure 6B:
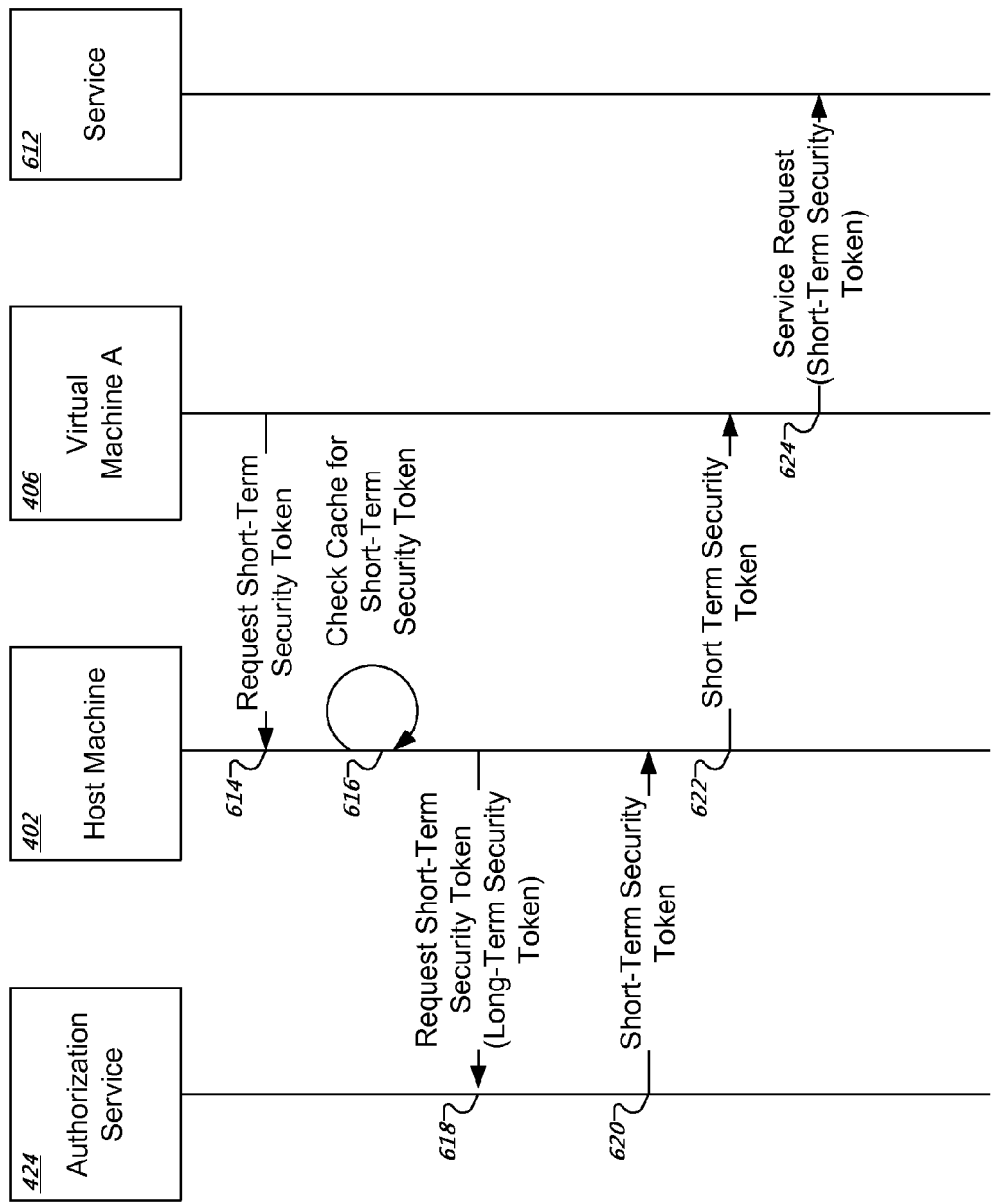

FIGS. 6A-B illustrate an example of a process whereby a virtual machine accesses a service. FIG. 6A is a flowchart of an example of a process 600 of the virtual machine accessing a service. The process may be executed by a computer system, such as, virtual machine authorization process 410, 412 executing on the host machine 402 of FIG. 4. For simplicity, the process will be described in terms of a system performing the process. FIG. 6B is a sequence diagram illustrating an example of a computer system executing the process 600.

Referring to FIG. 6A, the process 600 receives 602 a request for access to a service (e.g. an authorization process may receive the request). The request may come from a virtual machine. The request may include a service account and set of scopes associated with the request. The set of scopes may be a subset of the scopes for which the virtual machine is authorized. For example, a virtual machine that has read-write access to a cloud storage service may request read-only access to that service. In one implementation, referring to FIG. 6B, virtual machine A 406 requests 614 a short-term security token from the host machine 402.

The process 600 identifies 604 a long-term security token corresponding to the request (e.g. the authorization process may identify the long-term security token). For example, the process may identify a refresh token associated with the service account specified by the request. The refresh token may have been obtained using the process described above with respect to FIG. 5. In one implementation, referring to FIG. 6B, the host machine 402 checks 616 the cache for the short-term security token. If the short-term security token is in the cache, the host machine 402 provides the short-term security token to Virtual Machine A 406.

The process 600 sends 606 the long-term security token to an authorization server (e.g., the authorization process may send the long-term security token). The long-term security token may be sent to the authorization server along with the request. Alternatively, the long-term security token may be sent along with an identifier of the service and any scopes associated with the request. In one implementation, referring to FIG. 6B, the host machine 402 requests 618 a short-term security token from the authorization service 424. The request includes the long-term security token.

The process 600 receives 608 a short-term security token (e.g., the authorization process may receive the short-term security token). The token may be provided by the authorization server. For example, the authorization server may verify that the refresh token is valid to access the service consistent with the provided scopes. The authorization server may generate a short-term security token which grants temporary (for example, for one hour) access to the service, consistent with any provided scopes and any scope limitations in the service account. In one implementation, referring to FIG. 6B, the authorization service 424 sends the short-term security token to the host machine 402.

The process 600 provides 610 the short-term security token (e.g., the authorization process may provide the short-term security token to the requesting VM). For example, the process may provide the short-term security token to the requesting virtual machine. The virtual machine may use the short-term security token to access the service, for example, by including the short-term security token in a header of the HTTP request. In one implementation, the host machine 402 sends 622 the short-term security token to Virtual Machine A

406. Virtual Machine A 406 makes 624 a service request to a service 612. The request including the short-term security token.

Figure 7:
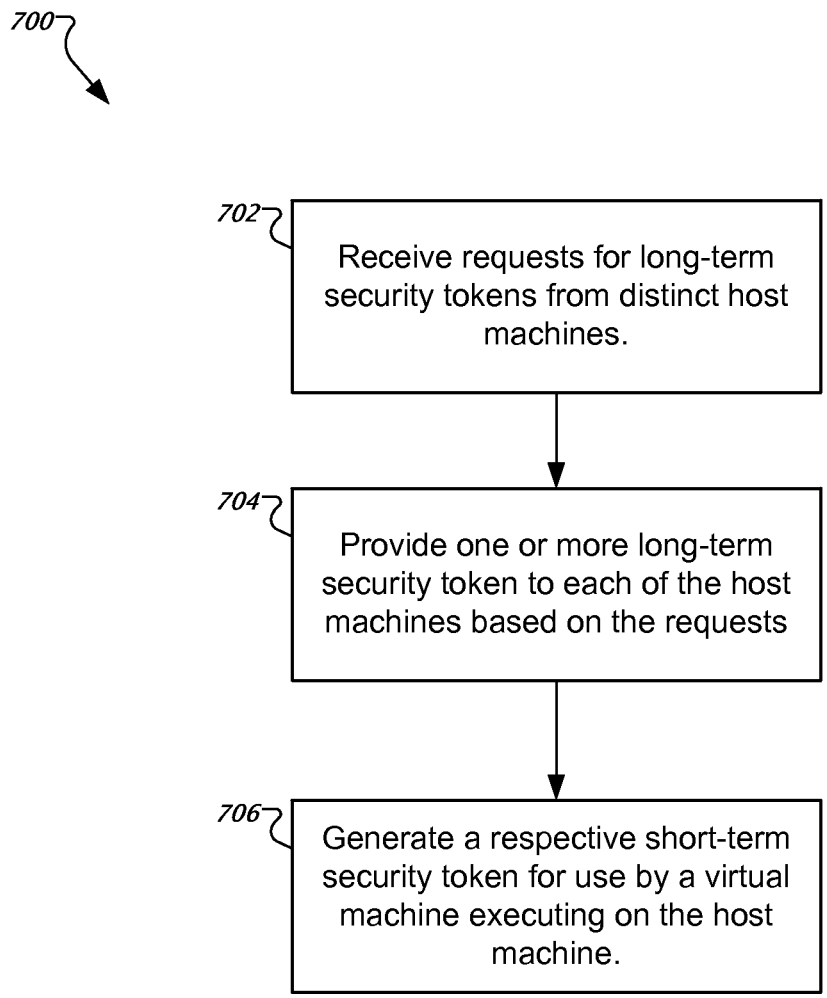
FIG. 7 is a flowchart of an example process whereby virtual machines access services.

FIG. 7 is a flowchart of an example of a process 700 whereby virtual machines access services. The process may be performed by the distributed system distributed system 101 of FIG. 1. For simplicity, the process will be described in terms of a system performing the process.

The process 700 receives 702 requests for long-term security tokens from distinct host machines (e.g. a virtual machine management service, such as the virtual machine management service 206 of FIG. 2, may receive requests for long-term security tokens from distinct host machines.) Each of the requests can include authentication information for a respective service account.

The process 700 provides 704 one or more long-term security tokens to each of the host machines based on the requests (e.g. a virtual machine management service, may provide security tokens for each of the host machines). A long-term security token may be used to generate a short-term security token for a virtual machine executing on the host machine, wherein a virtual machine is a hardware virtualization of the host machine and cannot access the long-term security token provided to the host machine.

The process 700 generates 706 a respective short-term security token for use by a virtual machine executing on the host machine (e.g. an authorization service, such as the authorization service 210 of FIG. 2, may generate short-term security tokens). The short-term security tokens may be used by a virtual machine executing on the host machine to access one of the service accounts. The short-term security token may be useable for a pre-determined amount of time.

Embodiments of the subject matter and the operations described in this specification can be implemented in digital electronic circuitry, or in computer software, firmware, or hardware, including the structures disclosed in this specification and their structural equivalents, or in combinations of one or more of them. Embodiments of the subject matter described in this specification can be implemented as one or more computer programs, i.e., one or more modules of computer program instructions, encoded on computer storage medium for execution by, or to control the operation of, data processing apparatus. Alternatively or in addition, the program instructions can be encoded on an artificially-generated propagated signal, e.g., a machine-generated electrical, optical, or electromagnetic signal, that is generated to encode information for transmission to suitable receiver apparatus for execution by a data processing apparatus. A computer storage medium can be, or be included in, a computer-readable storage device, a computer-readable storage substrate, a random or serial access memory array or device, or a combination of one or more of them. Moreover, while a computer storage medium is not a propagated signal, a computer storage medium can be a source or destination of computer program instructions encoded in an artificially-generated propagated signal. The computer storage medium can also be, or be included in, one or more separate physical components or media (e.g., multiple CDs, disks, or other storage devices).

The operations described in this specification can be implemented as operations performed by a data processing apparatus on data stored on one or more computer-readable storage devices or received from other sources.

The term "data processing apparatus" encompasses all kinds of apparatus, devices, and machines for processing data, including by way of example a programmable processor, a computer, a system on a chip, or multiple ones, or combinations, of the foregoing The apparatus can include special purpose logic circuitry, e.g., an FPGA (field programmable gate array) or an ASIC (application-specific integrated circuit). The apparatus can also include, in addition to hardware, code that creates an execution environment for the computer program in question, e.g., code that constitutes processor firmware, a protocol stack, a database management system, an operating system, a cross-platform runtime environment, a virtual machine, or a combination of one or more of them. The apparatus and execution environment can realize various different computing model infrastructures, such as web services, distributed computing and grid computing infrastructures.

A computer program (also known as a program, software, software application, script, or code) can be written in any form of programming language, including compiled or interpreted languages, declarative or procedural languages, and it can be deployed in any form, including as a stand-alone program or as a module, component, subroutine, object, or other unit suitable for use in a computing environment. A computer program may, but need not, correspond to a file in a file system. A program can be stored in a portion of a file that holds other programs or data (e.g., one or more scripts stored in a markup language resource), in a single file dedicated to the program in question, or in multiple coordinated files (e.g., files that store one or more modules, sub-programs, or portions of code). A computer program can be deployed to be executed on one computer or on multiple computers that are located at one site or distributed across multiple sites and interconnected by a communication network.

The processes and logic flows described in this specification can be performed by one or more programmable processors executing one or more computer programs to perform actions by operating on input data and generating output. The processes and logic flows can also be performed by, and apparatus can also be implemented as, special purpose logic circuitry, e.g., an FPGA (field programmable gate array) or an ASIC (application-specific integrated circuit).

Processors suitable for the execution of a computer program include, by way of example, both general and special purpose microprocessors, and any one or more processors of any kind of digital computer. Generally, a processor will receive instructions and data from a read-only memory or a random access memory or both. The essential elements of a computer are a processor for performing actions in accordance with instructions and one or more memory devices for storing instructions and data. Generally, a computer will also include, or be operatively coupled to receive data from or transfer data to, or both, one or more mass storage devices for storing data, e.g., magnetic, magneto-optical disks, or optical disks. However, a computer need not have such devices. Moreover, a computer can be embedded in another device, e.g., a mobile telephone, a personal digital assistant (PDA), a mobile audio or video player, a game console, a Global Positioning System (GPS) receiver, or a portable storage device (e.g., a universal serial bus (USB) flash drive), to name just a few. Devices suitable for storing computer program instructions and data include all forms of non-volatile memory, media and memory devices, including by way of example semiconductor memory devices, e.g., EPROM, EEPROM, and flash memory devices; magnetic disks, e.g., internal hard disks or removable disks; magneto-optical disks; and CD-ROM and DVD-ROM disks. The processor and the memory can be supplemented by, or incorporated in, special purpose logic circuitry.

To provide for interaction with a user, embodiments of the subject matter described in this specification can be implemented on a computer having a display device, e.g., a CRT (cathode ray tube) or LCD (liquid crystal display) monitor, for displaying information to the user and a keyboard and a pointing device, e.g., a mouse or a trackball, by which the user can provide input to the computer. Other kinds of devices can be used to provide for interaction with a user as well; for example, feedback provided to the user can be any form of sensory feedback, e.g., visual feedback, auditory feedback, or tactile feedback; and input from the user can be received in any form, including acoustic, speech, or tactile input. In addition, a computer can interact with a user by sending resources to and receiving resources from a device that is used by the user; for example, by sending web pages to a web browser on a user's client device in response to requests received from the web browser.

Embodiments of the subject matter described in this specification can be implemented in a computing system that includes a back-end component, e.g., as a data server, or that includes a middleware component, e.g., an application server, or that includes a front-end component, e.g., a client computer having a graphical user interface or a Web browser through which a user can interact with an implementation of the subject matter described in this specification, or any combination of one or more such back-end, middleware, or front-end components. The components of the system can be interconnected by any form or medium of digital data communication, e.g., a communication network. Examples of communication networks include a local area network ("LAN") and a wide area network ("WAN"), an inter-network (e.g., the Internet), and peer-to-peer networks (e.g., ad hoc peer-to-peer networks).

The computing system can include clients and servers. A client and server are generally remote from each other and typically interact through a communication network. The relationship of client and server arises by virtue of computer programs running on the respective computers and having a client-server relationship to each other. In some embodiments, a server transmits data (e.g., an HTML page) to a client device (e.g., for purposes of displaying data to and receiving user input from a user interacting with the client device). Data generated at the client device (e.g., a result of the user interaction) can be received from the client device at the server.

A system of one or more computers can be configured to perform particular operations or actions by virtue of having software, firmware, hardware, or a combination of them installed on the system that in operation causes or cause the system to perform the actions. One or more computer programs can be configured to perform particular operations or actions by virtue of including instructions that, when executed by data processing apparatus, cause the apparatus to perform the actions.

While this specification contains many specific implementation details, these should not be construed as limitations on the scope of any inventions or of what may be claimed, but rather as descriptions of features specific to particular embodiments of particular inventions. Certain features that are described in this specification in the context of separate embodiments can also be implemented in combination in a single embodiment. Conversely, various features that are described in the context of a single embodiment can also be implemented in multiple embodiments separately or in any suitable subcombination. Moreover, although features may be described above as acting in certain combinations and even initially claimed as such, one or more features from a claimed combination can in some cases be excised from the combination, and the claimed combination may be directed to a subcombination or variation of a subcombination.

Similarly, while operations are depicted in the drawings in a particular order, this should not be understood as requiring that such operations be performed in the particular order shown or in sequential order, or that all illustrated operations be performed, to achieve desirable results. In certain circumstances, multitasking and parallel processing may be advantageous. Moreover, the separation of various system components in the embodiments described above should not be understood as requiring such separation in all embodiments, and it should be understood that the described program components and systems can generally be integrated together in a single software product or packaged into multiple software products.

Thus, particular embodiments of the subject matter have been described. Other embodiments are within the scope of the following claims. In some cases, the actions recited in the claims can be performed in a different order and still achieve desirable results. In addition, the processes depicted in the accompanying figures do not necessarily require the particular order shown, or sequential order, to achieve desirable results. In certain implementations, multitasking and parallel processing may be advantageous.

What is claimed is:

1. A method implemented by data processing apparatus, the method comprising:
   receiving a plurality of requests for long-term security tokens from a host machine, each request comprising authentication information for a respective service account;
   providing one or more of the long-term security tokens to the host machine based on the plurality of requests, wherein the one or more long-term security tokens can be used to generate short-term security tokens for virtual machines executing on the host machine, wherein the virtual machines are hardware virtualizations on the host machine and cannot access the one or more long-term security token provided to the host machine; and
   generating by a process executing in a host operating system of the host machine a short-term security token based on a long-term security token of the one or more long-term security tokens for use by a virtual machine executing on the host machine to access one of the respective service accounts, wherein the short-term security token is different than the long-term security token and the short-term security token is useable for a pre-determined amount of time.

2. The method of claim 1 wherein a particular request of the plurality of requests includes scope information and wherein the scope information identifies limits of access to one of the respective service accounts.

3. The method of claim 2 wherein a distinct long-term security token is provided for each service account and corresponding scope information.

4. The method of claim 1 wherein providing the one or more long-term security tokens comprises:
   determining that a long-term security token is not available for a respective service account; and
   generating the long-term security token.

5. The method of claim 1 wherein the process executing in the host operating system executes in user process space of the host operating system.

6. The method of claim 1, further comprising:
   receiving a request to modify service accounts associated with a virtual machine executing on a host machine;
   obtaining a long-term security token based on the request; and
   providing the long-term security token to the host machine.

7. The method of claim 1, further comprising receiving a request for the short-term access token from the virtual machine, wherein the request is received by a virtualized network service.

8. A non-transitory, computer storage medium encoded with computer program instructions that when executed by one or more computers cause the one or more computers to perform operations comprising:
receiving a plurality of requests for long-term security tokens from a host machine, each request comprising authentication information for a respective service account;
providing one or more of the long-term security tokens to the host machine based on the plurality of requests, wherein the one or more long-term security tokens can be used to generate short-term security tokens for virtual machines executing on the host machine, wherein the virtual machines are hardware virtualizations on the host machine and cannot access the one or more long-term security token provided to the host machine; and
generating by a process executing in a host operating system of the host machine a short-term security token based on a long-term security token of the one or more long-term security tokens for use by a virtual machine executing on the host machine to access one of the respective service accounts, wherein the short-term security token is different than the lone-term security token and the short-term security token is useable for a pre-determined amount of time.

9. The medium of claim 8 wherein a particular request of the plurality of requests includes scope information and wherein the scope information identifies limits of access to one of the respective service accounts.

10. The medium of claim 9 wherein a distinct long-term security token is provided for each service account and corresponding scope information.

11. The medium of claim 8 wherein providing the one or more long-term security tokens comprises:
determining that a long-term security token is not available for a respective service account; and
generating the long-term security token.

12. The medium of claim 8 wherein the process executing in the host operating system executes in user process space of the host operating system.

13. The medium of claim 8, further comprising computer program instructions that when executed by one or more computers cause the one or more computers to perform operations comprising:
receiving a request to modify service accounts associated with a virtual machine executing on a host machine;
obtaining a long-term security token based on the request; and
providing the long-term security token to the host machine.

14. The medium of claim 8, further comprising computer program instructions that when executed by one or more computers cause the one or more computers to perform operations comprising receiving a request for the short-term access token from the virtual machine, wherein the request is received by a virtualized network service.

15. A system comprising:
one or more computers and one or more storage devices storing instructions that are operable, when executed by the one or more computers, to cause the one or more computers to perform operations comprising:
receiving a plurality of requests for long-term security tokens from a host machine, each request comprising authentication information for a respective service account;
providing one or more of the long-term security tokens to the host machine based on the plurality of requests, wherein the one or more long-term security tokens can be used to generate short-term security tokens for virtual machines executing on the host machine, wherein the virtual machines are hardware virtualizations on the host machine and cannot access the one or more long-term security token provided to the host machine; and
generating by a process executing in a host operating system of the host machine a short-term security token based on a long-term security token of the one or more long-term security tokens for use by a virtual machine executing on the host machine to access one of the respective service accounts, wherein the short-term security token is different than the lone-term security token and the short-term security token is useable for a pre-determined amount of time.

16. The system of claim 15 wherein a particular request of the plurality of requests includes scope information and wherein the scope information identifies limits of access to one of the respective service accounts.

17. The system of claim 16 wherein a distinct long-term security token is provided for each service account and corresponding scope information.

18. The system of claim 15 wherein providing the one or more long-term security token comprises:
determining that a long-term security token is not available for a respective service account; and
generating the long-term security token.

19. The system of claim 15 wherein the process executing in the host operating system executes in user process space of the host operating system.

20. The system of claim 15 wherein the one or more storage devices further store instructions that are operable, when executed by the one or more computers, to cause the one or more computers to perform operations comprising:
receiving a request to modify service accounts associated with a virtual machine executing on a host machine;
obtaining a long-term security token based on the request; and
providing the long-term security token to the host machine.

21. The system of claim 15, wherein the one or more storage devices further store instructions that are operable, when executed by the one or more computers, to cause the one or more computers to perform operations comprising receiving a request for the short-term access token from the virtual machine, wherein the request is received by a virtualized network service.

* * * * *